March 10, 1964  H. F. WELSH ETAL  3,124,791
POSITIONING MECHANISM CONTROL CIRCUIT
Filed June 17, 1960  3 Sheets-Sheet 1

INVENTORS
HERBERT F. WELSH
JAMES B. DEYSHER
BEVERLY L. CREW

William G. Miller Jr.
AGENT

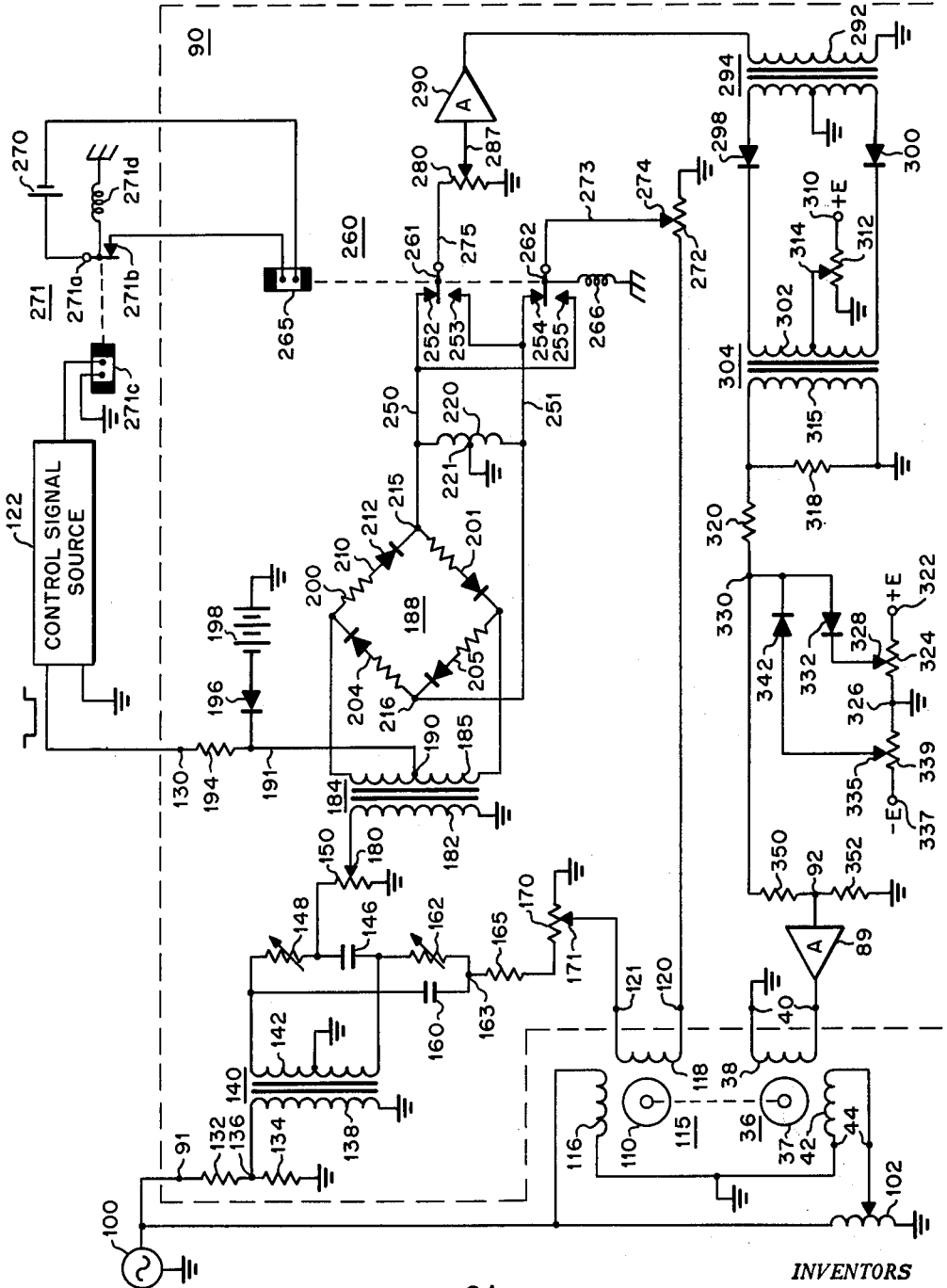

United States Patent Office 3,124,791
Patented Mar. 10, 1964

3,124,791
POSITIONING MECHANISM CONTROL CIRCUIT
Herbert F. Welsh, Philadelphia, and James B. Deysher, Ambler, Pa., and Beverly L. Crew, Rockville, Md., assignors to Sperry Rand Corporation, New York, N.Y., a corporation of Delaware
Filed June 17, 1960, Ser. No. 36,964
2 Claims. (Cl. 340—174.1)

This invention relates to control circuits of the type used for positioning a moveable carriage in stepwise fashion to consecutive positions. More particularly this invention relates to positioning mechanisms and their associated control circuits for positioning transducers or marking devices to selected positions as determined by signals from the control circuits. For example, the positioning of a magnetic head or reading or writing on particular peripheral tracks of a magnetic drum may utilize a motor drive and a control circuit to energize the motor drive to move a carriage carrying the magnetic head a predetermined distance along the drum. One method for moving the carriage such a predetermined distance is to sequentially position the head to a number of consecutive step positions until the predetermined distance has been traversed. This type of positioning operation may be accomplished, for example, by the consecutive stepping of the motor to drive the carriage from one step to the next step in response to consecutive input signals. The traversal of the desired distance by the head may be detected by counting the input signals.

In order to utilize the storage capacity of a magnetic drum, for example, to best advantage in conjunction with a digital computer, it is necessary to provide a maximum speed as well as a high degree of accuracy in the positioning of the head. Otherwise, the speed at which the computer may operate will be seriously limited.

It is a primary object of this invention to provide an improved control circuit for a positioning mechanism.

It is a further object of this invention to provide a control circuit for positioning mechanisms utilizing consecutive steps to move to the desired position.

It is an object of this invention to provide a control system for quickly and accurately controlling the positioning of a magnetic head into operative relationship to a predetermined track of a record member having a plurality of tracks.

Another object of this invention is the provision of a control circuit for reading or writing consecutively in a series of tracks by stepping a transducer carriage from one step position to a following step position in response to a control signal.

It is another object of this invention to provide a rapid positioning mechanism without over-shoot.

In carrying out the above objects, this invention provides a positioning mechanism for a moveable carriage having a spring biased pawl for engaging the carriage with a positioning rack to establish consecutive positions for the carriage as defined by the junctions between consecutive teeth of the rack.

The carriage is driven by a motor drive energized for a predetermined period of time sufficient to allow the motor to move the carriage so that the pawl crosses the peak of an adjacent tooth of the rack to place the pawl in engagement with a sloping tooth edge defining the adjacent position desired. The speed of the motor drive is limited by a means responsive to the speed of the carriage. This last-named means likewise applies a braking force to the carriage upon termination of the energization of the motor as the spring bias of the pawl forces the pawl down the sloping edge to bring the carriage to a new step position.

The foregoing objects, advantages and novel features of this invention both as to its organization and mode of operation may be best understood from the following explanation when read in conjunction with the accompanying drawings in which like reference numerals refer to like parts and in which:

FIGURE 2 is a circuit diagram of the control circuit for the positioning mechanism of FIGURE 1.

Figures 1, 3:
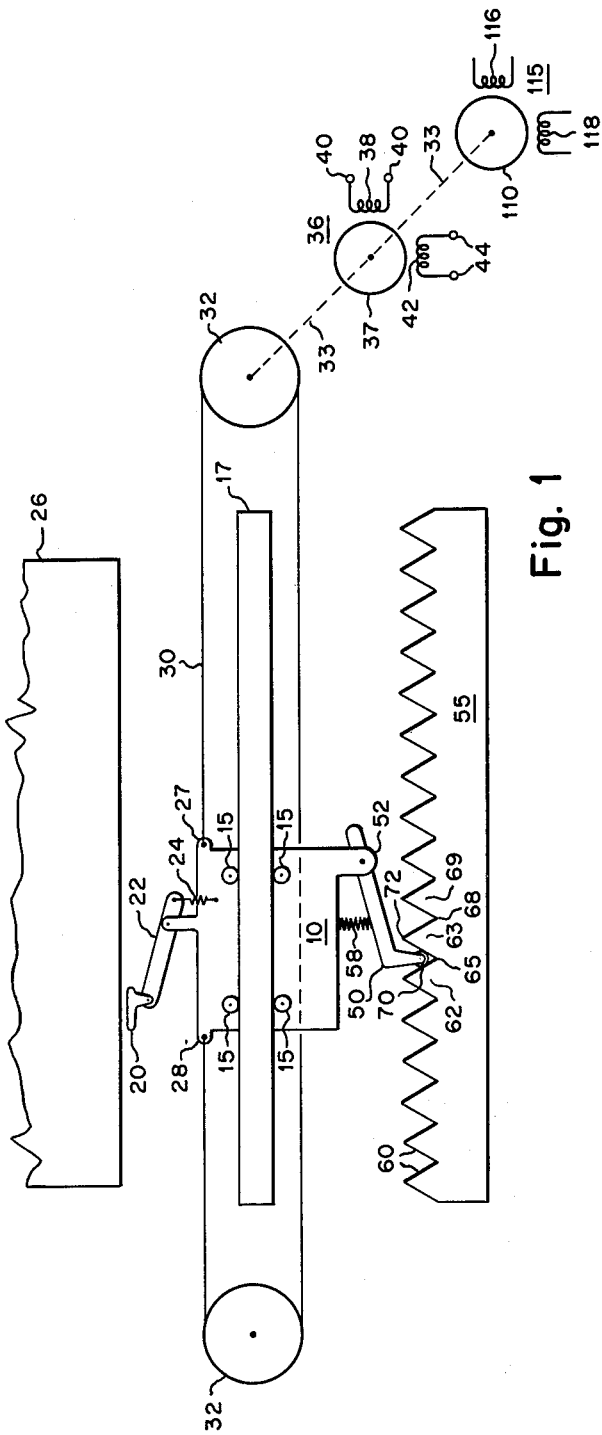
FIGURE 1 is an elevation view of a carriage positioning mechanism of the type which may be positioned in a stepwise fashion.
FIGURE 3 is an enlarged view of a portion of the toothed positioning rack of FIGURE 1.

FIGURE 1 illustrates an application of the novel positioning mechanism and control circuit of this invention to magnetic drum recording. In FIGURE 1, carriage 10 is mounted to move on supporting bearings 15 along guide 17, which may be a cylindrical rod or other suitable type of guide member. The carriage 10 supports a magnetic head 20 which is mounted on the carriage through a linkage 22. This linkage is biased by spring 24 to move the head toward magnetic drum 26. The magnetic head 20 may, for example, be of a type which utilizes the principle of the Kingsbury thrust bearing to maintain the head floating on the ambient air carried by rotating drum 26. The drum 26 may characteristically have a number of tracks of record information recorded magnetically around its periphery. In order to read or record information in these tracks, it is necessary to position the head 20 by moving the carriage 10 from one position to another in order to place the head 20 in juxtaposition with the track to be used. Moving of the carriage 10 is accomplished in the arrangement shown in FIGURE 1 by moving the cord 30 which is attached to the carirage at points 27 and 28 over the pulleys 32 as by means of drive motor 36 which is coupled by shaft 33 to one of the pulleys 32. This movement of the carriage may be in either a right hand or a left hand direction as required. The direction of rotation of the rotor 37 of motor 36 is determined by the phase of the energizing signal feed to motor winding 38 from terminals 40. The other motor winding 42 of the motor 36 is supplied with an energizing signal of a fixed phase from terminals 44. Energization of winding 38 in a first phase moves the carriage to the left while energization in a phase displaced 180° from the first phase causes motion of the carriage to the right.

As carriage 10 moves along the guide 17 either to the left or to the right, pawl 50 which is pivotally mounted to the carriage 10 at point 52 moves along toothed rack 55 and is held in engagement with the teeth of rack 55 by the bias of spring 58. The rack 55 may be stationary if fixed positions are to be defined by the junctions between consecutive teeth. Alternatively, rack 55 may be positioned by separate positioning means not shown if additional positions are to be established.

The teeth of rack 55 are formed, for example, by sloping edges 60. The junction between the sloping edges 60 of adjacent teeth such as 62 and 63 determines the point 65, for example, which defines a step position for carriage 10 and hence the head 20.

If, for example, it is desired to move the carriage 10 from the position defined by point 65 to that defined by point 68 which is the junction between the sloping edge of tooth 69 and tooth 63, it is necessary to energize the motor 36 by supplying power for a fixed period of time to motor winding 38 in the proper phase to produce motion of the carriage 10 to the right. Motor 36 must be energized for a sufficient period of time to carry the roller 70 over the peak 72 of tooth 63. Once the roller 70 has engaged the sloping right hand edge of tooth 63, the bias resulting from spring 58 tends to force the roller 70 down the sloping right hand edge of tooth 63 to the point 68 and hence to the next step position for carriage 10.

A control circuit for accomplishing the translation of the carriage 10 from one step position to the next step position, as described above, is shown in FIGURE 2. In FIGURE 2, motor 36 has its variable phase winding 38 supplied from amplifier 89 which receives and amplifies signals supplied from the output of control circuit 90 at terminal 92.

The fixed phase of motor 36 is supplied to winding 42 from a source of alternating potential 100 which may be reduced in voltage by interposing a variable transformer such as 102.

Motor 36 has its rotor mechanically coupled by shafts 33 to the rotor 110 of an A.C. tachometer 115. Tachometer 115 has a fixed phase winding 116 supplied from the source 100 by way of connecting line 101. The other winding 118 of tachometer 115 produces upon rotation of rotor 110 an alternating output at terminals 120 and 121. The phase of this alternating current depends upon the direction of rotation of rotor 110 and the phases of current produced for the two directions of rotation will differ by 180°.

Figure 4:
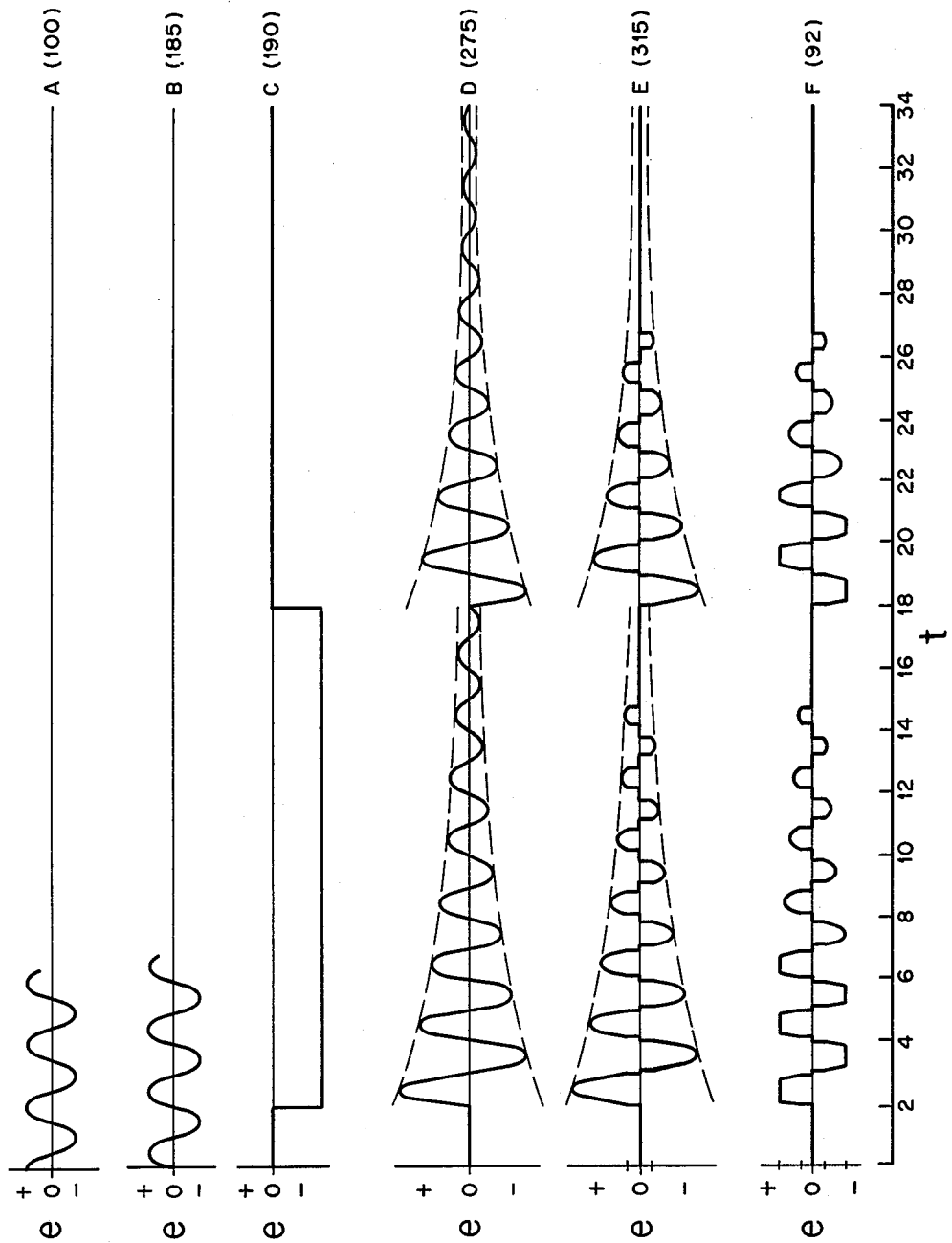
FIGURE 4 is a timing diagram showing the signals at various points in the control circuit of FIGURE 3 during operation.

Control circuit 90 receives at terminal 130 input signals from control signal source 122, each of which indicates a single step of the carriage 10 is desired. These input signals may, for example, each be a negative pulse as shown in FIGURE 4, line C, having a fixed duration sufficient to produce a single step movement of the carriage 10 in the desired direction.

The source 100 of FIGURE 2 feeds at terminal 91 energy for driving motor 36 through control circuit 90. This source 100 is connected across a voltage divider comprised of resistors 132 and 134 in control circuit 90 to provide a reduced potential at terminal 136. This reduced potential is, in turn, coupled across the primary winding 138 of an isolation transformer 140. The secondary 142 of isolation transformer 140 has a center tap connected to ground and has its opposite ends connected across an adjustable phase shifting circuit which is comprised of the series combination of capacitor 146 and variable resistor 148. The junction point of the capacitor 146 and resistor 148, in turn, is connected to one terminal of resistor 150 which has its other terminal connected to ground. By adjustment of the resistance of resistor 148, the phase of the potential supplied to resistor 150 can be varied as required to provide the desired phase relationship between the potential supplied to the winding 42 of motor 36 and that supplied to winding 38 from the output of control circuit 90.

Another similar adjustable phase shifting circuit comprising the series combination of capacitor 160 and variable resistor 162 is connected in parallel with the above-mentioned phase shifting circuit and across the secondary 142 of isolation transformer 140. The junction 163 between the capacitor 160 and the resistor 162 is connected through a fixed resistor 165 and a resistor 170 having a variable tap 171 to ground. The potential appearing between the variable tap 171 and the ground connection of resistor 170 is connected in series with the output winding 118 of tachometer 115. This connection is in polarity to produce by means of adjustment of variable tap 171 of resistor 170 a potential which will cancel any residual output of tachometer 115 which may appear across winding 118 when the rotor 110 of tachometer 115 is stationary. Therefore, the terminal 120 is maintained at ground potential in the absence of rotation of rotor 37 of motor 36.

A variable tap 180 on resistor 150 is adjusted to provide the desired potential across primary winding 182 of transformer 184. The secondary winding 185 of transformer 184 is connected across bridge circuit 188. The secondary winding 185 also has a center tap connection 190. The center tap 190 is, in turn, connected through conductor 191 and resistor 194 to the source of input signals at terminal 130. The conductor 191 is also connected to the cathode of a diode 196 whose anode is connected to the negative terminal of potential source 198. The positive terminal of potential source 198 is, in turn, connected to ground. Thus, the source 198, in combination with the diode 196, resistor 194 and the source of input signals connected to terminal 130, serves to limit the variation of potential of the center tap connection 190 of transformer 185 to a potential substantially equal to that of source 198. The input signals which are negative pulses, as previously mentioned, therefore, cannot produce a negative potential at center tap 190 greater than the potential of source 198 regardless of the potential of the input signals.

When there are no input signal pulses at terminal 130, terminal 130 is at ground potential and the alternating potential appearing across secondary 185 causes current to flow alternately through the adjacent legs 200 and 201 and the adjacent legs 204 and 205 of bridge 188. Each of the legs 200–205 consist of a fixed resistor and a diode, such as resistor 210 and diode 212, in leg 200. The resistor in each of the legs are equal in value and, therefore, the potential at the bridge output terminals 215 and 216 is at ground potential whenever the potential at center tap connection 190 is at ground potential.

The output terminals 215 and 216 of the bridge 188 are connected across auto transformer 220 which has a center tap 221 connected to ground. No potential appears across auto transformer 220 whenever the potential at center tap connection 190 is at ground potential since the center tap 221 is also at ground potential as are terminals 215 and 216.

Upon occurrence of an input signal at terminal 130 consisting of a negative pulse of predetermined duration, the center tap connection 190 goes negative, and if the magnitude of the input pulse is greater than the potential of source 198, the center tap connection goes negative to substantially the same potential as source 198. Simultaneous with the negative excursion of the potential of center tap 190, the grounded center tap 221 supplies current through auto transformer 220 and through appropriate arms of bridge 188 in accordance with the existing polarity of the A.C. across winding 185 and thence through the secondary 185 to center tap 190. This current flow in auto transformer 220 varies in direction depending upon the relative polarities of the ends of secondary 185 and varies in magnitude depending on the magnitude of the A.C. across winding 185 with the result that there is produced across auto transformer 220 an alternating current potential whose maximum amplitude is dependent upon the potential of center tap 190. The input signal, at terminal 130 is desirably of sufficient amplitude to produce at center tap 190 a negative potential substantially equal to that of source 198, therefore, the amplitude of the A.C. produced across transformer 220 is normally fixed by the potential of source 198.

This alternating potential across transformer 220 is connected through conductors 250 and 251 to contacts 252, 253, 254, 255 of reversing relay 260. Reversing relay 260, as shown, may have its armatures 261 and 262 positioned in contact with a pair of stationary contacts 252, 254 or 253, 255 in dependence upon the energization of the relay coil 265. In the circuit of FIGURE 2, the relay coil 265 is assumed to be energized, as shown, and therefore, the armatures 261 and 262 are in contact with terminals 252 and 254. The energization of relay coil 265 is provided by source 270 which energizes coil 265 when the relay contacts 271a and 271b are closed as shown. When coil 265 is in the deenergized state the armatures 261 and 262 contact stationary contacts 253 and 255 by virtue of the tension of spring 266.

With the relay coil 265 energized, the relay 260 provides the connections to produce power in the necessary phase at winding 38 for energizing the motor 36 to produce motion of the carriage 10 to the right. When coil 265 is deenergized the phase of the energization is shifted 180° to cause motion of the carriage 10 to the left.

As shown in FIGURE 2 the relay contacts 271a and 271b are closed by the action of spring 271d to complete the circuit between source 270 and coil 265 and are opened to break that circuit by energization of relay coil 271c in response to a signal from control signal source 122.

The output terminal 120 of the tachometer 115 is connected to ground through resistor 272 which has a variable tap 274. The potential between the ground and the variable tap 274 is then, by way of conductor 273, placed in series with the potential across auto transformer 220 to provide the potential at terminal 275. As previously described, the potential produced by the tachometer 115 is an alternating potential, which is desirably 180° out of phase with the potential appearing across autotransformer 220, therefore, during rotation of the motor 36 and the tachometer 115, there is produced across the lower portion of resistor 272 a feed-back potential which tends to oppose the potential across autotransformer 220. This feedback potential limits the potential appearing at terminal 275 during initial low speed rotation of rotor 37 and increasingly diminishes that potential as the rotor speed increases.

Terminal 275 is connected through resistor 280 to ground. Associated with resistor 280 is a variable tap 282 which is connected to the input of amplifier 290. Amplifier 290 may be a power amplifier of the type well known in the art. The output of amplifier 290 is connected to the primary 292 of isolation transformer 294. The secondary 296 of isolation transformer 294 is provided with a grounded center tap so that there will alternately appear at the ends of secondary 296 potentials which will be positive with respect to ground.

The secondary 296 is connected to a center clipping circuit which comprises diodes 298 and 300 which are each connected to carry current from one side of the secondary 296 to one side of the primary 302 of isolation transformer 304. The center tap connection of the primary 302 is connected to an adjustable source of potential comprised of potential source 310 which is connected through resistor 312 to ground and which has an adjustable tap 314 connected to the center tap of primary 302. The potential established by the adjustment of the adjustable tap 314 establishes the potential which must be exceeded by the potential across either half of the secondary 296 to produce current flow through the primary 302 by way of diode 298 or 300. When the potential of either half of the secondary 298 is below the potential established by the tap 314 no current flows through the primary 302 and, therefore, no signal is transferred from the transformer 304 to the subsequent circuit. However, current flow through primary 302 due to sufficient potential across half of the secondary 296 induces a potential in secondary 315 of isolation transformer 304. The secondary 315 of transformer 304 is connected, in turn, to a peak limiting circuit which is operative to limit the peak voltages of the alternating potential supplied by the secondary 315. This peak limiting circuit consists of a shunting resistor 318 across the secondary 315 and a series resistor 320 in series with secondary 315. The potential established at the terminal of the resistor 320 opposite the terminal connected to secondary 315 is limited both in its positive excursions and its negative excursions by adjustable sources of both positive and negative potentials. The adjustable source of positive potential consists of a connection of a positive terminal of source 322 to provide current flow through a resistor 324 to grounded terminal 326. A variable tap 328 on resistor 324 establishes a positive potential which cannot be exceeded. This is provided by the connection from terminal 330 to the anode of diode 332 whose cathode is connected to the variable tap 328 so that current can flow through diode 332 to ground by way of resistor 324 when the potential at terminal 330 is above the desired peak as set by adjustable tap 328.

The negative potential which cannot be exceeded by the potential at terminal 330 is established by tap 335 of resistor 339 which connects the negative terminal 337 of a source to grounded terminal 326 through resistor 339. Tap 335 is connected to terminal 330 by way of diode 342 which is poled to allow for current flow when the terminal 330 tends to be more negative than the potential established by the tap 335.

The alternating potential appearing at terminal 330 is then reduced by a voltage divider comprising resistors 350 and 352 and the output of the control circuit is provided at the junction between these resistors, namely, terminal 92.

From the above explanation it is evident that the closure of the switch 271 along with the appearance of an input pulse at terminal 130 causes an alternating voltage to appear at terminal 92 and hence across motor winding 38 for the duration of the input pulse at terminal 130. The wave shapes at various points in control circuit 90 and the way in which the resulting alternating output voltage moves carriage 10 in a single step along rack 55 may be best illustrated by reference to FIGURES 3 and 4 in conjunction with FIGURE 2. In FIGURE 4 the alternating potential shown along line A corresponds to the potential of the source 100 while the alternating potential appearing along line B corresponds to the potential across the secondary 185 of transformer 184. It will be noted from FIGURE 4 that the phase of the alternating potential along line B is shifted 90° from that along line A. This is accomplished by joint adjustment of the phase shifting networks consisting of capacitors 146 and 160 in conjunction with resistors 148 and 162 (FIGURE 2). During the time $t_0$–$t_2$, there is no input pulse at input terminal 130 and hence there will be a zero potential at center tap 190, and shown by the curve along line C. There will also be a zero potential at terminal 275, as shown by the curve along line D. There will also be zero potential across secondary 315, as shown along line E, and at output terminal 92, as shown along line F.

Upon occurrence of an input signal at terminal 130 starting at the time $t_2$, the potential at center tap 190 will go negative as shown along line C of FIGURE 4. At this time, the potential at terminal 275 will alternate in phase with the potential across secondary 185 of transformer 184 which is shown along line D of FIGURE 4. This alternating current potential at terminal 275 produces an alternating potential across secondary 315 such as that shown along line E of FIGURE 4. This potential being at zero before and after the zero cross-over point for the potential at point 275 as a result of a clipping action of the center clipping circuit previously described. The potential across secondary 315 is then further altered by the peak limiting circuit, as previously described, to produce the alternating potential at output terminal 92, shown along line F of FIGURE 4, which has limited peaks and a minimum potential as established by the center clipping circuit.

As the alternating potential produced at terminal 92 causes motor 36 to move carriage 10, the armature 110 of the tachometer 115 also rotates and produces at terminals 120 and 121 a potential 180° out of phase with the potential across autotransformer 220 to produce at terminal 275 an alternating potential which reduces in amplitude as the speed of motor 36 increases.

The energization of the motor 36 by the control circuit 90 during an input pulse at terminal 130 serves to move the carriage 10 of FIGURE 1 to the right and the duration of the input pulse at terminal 130 is preferably just sufficient to cause the carriage to move the roller 70 of pawl 50 across the peak 72 of tooth 63 to a point 360 on the sloping right hand edge 361 at time $t_{18}$, namely at the end of the input pulse (see FIGURE 3). The frequency of the A.C. waves shown may, for example, be 400 cycles and the duration of the input pulse may be approximately 20 milliseconds.

The amplitude of the potential produced at terminal 92 gradually decreases as shown between $t_2$ and $t_{15}$, as a result of the feed-back provided by tachometer 115 until the action of the center clipping circuit causes the potential at terminal 92 to go to zero, when the speed of motor 36 has reached the desired maximum value as between $t_{15}$ and $t_{18}$, thus cutting off power to winding 38 of motor 36.

With the discontinuation of energization of motor 36 at time $t_{15}$, the inertia of the motor and its associated drive mechanism and connected carriage 10 in combination with the bias established by spring 58 on pawl 50 causes roller 70 of pawl 50 to tend to descend the sloping right hand edge 361 (FIGURE 3) of tooth 63. As roller 70 descends sloping edge 361 (FIGURE 3), it tends to continue driving tachometer 115 to thereby produce at terminal 275 a tachometer feed-back voltage established by winding 118 of tachometer 115 which is out of phase with the driving potential previously established for driving motor 36. This feed-back voltage from the tachometer, winding 118 thus plugs the motor by providing a braking voltage as shown, for example, after time $t_{18}$, on line D of FIGURE 4. This braking voltage diminishes in amplitude as the motor 36 and carriage 10 slow down.

The braking voltage, supplied by tachometer 115, eventually reduces below that established by tap 314 of resistor 312 in the center clipping circuit and at that time, namely $t_{27}$, the potential supplied to the winding 38 of motor 36 is reduced to zero. There is thus established a definite speed during the braking action at which the braking voltage is removed to prevent over-damping of the carriage motion. The bias of spring 58 on pawl 50 as well as the inertia of the carriage and the coupled elements then serves to move the roller 70 from point 362 corresponding to the time $t_{27}$, to point 68 which corresponds to the next step position at $t_{34}$, substantially without overshoot.

Adjustment of the various parameters of the circuit of FIGURE 2 allows the establishment of the desired duration for the above-mentioned sequential periods of the step. The circuit parameters are desirably of values providing for movement of carriage 10 to its next step position in as short a time as possible and without overshoot. It will be evident, however, that should the roller 70 of pawl 50 overshoot point 68, it will then be positioned on the sloping edge 370 (FIGURE 3) of the adjacent tooth 69 and the bias of spring 58 will cause the roller 70 to descend to position 68 with similar braking action from tachometer 115 as previously described.

When it is desired to provide a translation of the carriage 10 to the left (FIGURE 1), the switch 271 may be opened and relay 265 de-energized to allow spring 266 to bring armatures 261 and 262 into contact with contacts 253 and 255 respectively, thereby changing the phase of the voltage supply to winding 38 by 180° and causing the motor 36 to rotate in a direction to move the carriage 10 in the left hand direction in response to any input signals supplied to terminal 130.

What is claimed is:
1. A recording system comprising:
   a recording member mounted for movement in a certain direction and having a plurality of tracks extending in said direction and spaced transversely thereto,
   a recording transducer carriage having a transducer movable adjacent said recording member and transverse to said direction of movement to different positions corresponding to said tracks,
   a rack having a plurality of V-shaped teeth spaced to correspond to said tracks, said rack being transverse to said direction of movement, the junction between each tooth defining a step position,
   a spring biased pawl mounted on said carriage for engagement with the teeth of said rack,
   a motor coupled to move said carriage with respect to said rack,
   control means for selectively energizing said motor with a source of power for moving said carriage from one step position to another, said energization being applied for a predetermined period of time sufficient in duration to cause said motor to move said carriage along said rack a distance to move said pawl from a step position junction along the face and over the point of its associated tooth to the opposite face thereof, and
   a tachometer coupled in driving relationship with said motor and said carriage and electrically coupled to said control means in a manner to oppose the energization of said motor by said source, said tachometer being effective to brake the motion of said carriage as the spring bias of the pawl causes said pawl to move along said opposite face of said associated tooth to its associated junction defining the next step position, whereby overshoot of said next step position is substantially prevented.

2. A recording system comprising:
   a magnetic recording drum mounted for rotation about its axis and having a plurality of peripheral tracks spaced along the axial length of said drum,
   a carriage having a magnetic head mounted thereon, said carriage being movable along said axial length to position said head adjacent said tracks,
   a rack having a plurality of V-shaped teeth spaced along said axial length of said drum corresponding to the positions of said tracks, the portion between each tooth defining a step position,
   a spring biased pawl mounted on said carriage for engagement with the teeth of said rack,
   a motor coupled to move said carriage with respect to said rack,
   control means for selectively energizing said motor with a source of power for moving said carriage from one step position to another, said energization being applied for a predetermined period of time sufficient in duration to cause said motor to move said carriage along said rack a distance to move said pawl from a step position junction along the face and over the point of its associated tooth to the opposite face thereof, and
   a tachometer coupled in driving relationship with said motor and said carriage and electrically coupled to said control means in a manner to oppose the energization of said motor by said source, said tachometer being effective to brake the motion of said carriage as the spring bias of the pawl causes said pawl to move along said opposite face of said associated tooth to its associated junction defining the next step position, whereby overshoot of said next step position is substantially prevented.

References Cited in the file of this patent
UNITED STATES PATENTS

| | | |
|---|---|---|
| 2,884,581 | Schunemann et al. | Apr. 28, 1959 |
| 2,910,669 | Brand | Oct. 27, 1959 |
| 2,913,655 | O'Neill | Nov. 17, 1959 |
| 2,954,547 | Singhaus | Sept. 27, 1960 |
| 2,994,856 | Dickinson | Aug. 1, 1961 |
| 3,025,710 | Muffley | Mar. 20, 1962 |

UNITED STATES PATENT OFFICE
CERTIFICATE OF CORRECTION

Patent No. 3,124,791                                  March 10, 1964

Herbert F. Welsh et al.

It is hereby certified that error appears in the above numbered patent requiring correction and that the said Letters Patent should read as corrected below.

Column 1, line 17, for "or reading" read -- for reading --.

Signed and sealed this 4th day of August 1964.

(SEAL)
Attest:

ERNEST W. SWIDER                              EDWARD J. BRENNER
Attesting Officer                                    Commissioner of Patents